Feb. 14, 1967    T. W. MARTINEK ET AL    3,304,446
ELECTROSTRICTIVE FLUID TRANSDUCER
Filed Dec. 26, 1963

INVENTORS.
THOMAS W. MARTINEK
DONALD L. KLASS
BY
ATTORNEY.

United States Patent Office 3,304,446
Patented Feb. 14, 1967

3,304,446
ELECTROSTRICTIVE FLUID TRANSDUCER
Thomas W. Martinek, Crystal Lake, and Donald L. Klass, Barrington, Ill., assignors, by mesne assignments, to Union Oil Company of California, Los Angeles, Calif., a corporation of California
Filed Dec. 26, 1963, Ser. No. 336,098
12 Claims. (Cl. 310—8)

This invention relates to transducers and, more particularly, to transducers utilizing an electrostrictive fluid. Electro-viscous fluids are especially useful as the electrostrictive fluids in the transducers of this invention.

It is known that certain fluids respond to the influence of an electric potential by evidencing an apparent and pronounced increase in bulk viscosity. This phenomenon is reversible, and the compositions revert to their initial viscosity when the electric field is removed. Such electro-viscous fluids are sold under the trademark of Electro Fluid and are described in U.S. patents to Willis M. Winslow 2,661,596, 2,661,825 and 3,047,507. Electro-viscous fluids are commonly used in clutches, wherein the fluid is disposed between the surfaces of two electrically conductive members and electric potential is imposed across the two members. The electro-viscous fluid responds to the application of an electric potential by instantaneously, but reversibly, changing in apparent bulk viscosity. In strong fields, the fluid thickens into a solid or semi-solid condition, whereby torque can be transmitted between the surfaces of the clutch members. Certain electro-viscous fluids exhibit a similar change in bulk viscosity when exposed to an alternating electric field, even though the fluid is not in contact with the potential-carrying electrodes. This phenomenon is used in chucking devices to secure objects with an electro-viscous fluid film.

Electro-viscous fluids are also electrostrictive, i.e., they exhibit a change in volume upon being exposed to an electric potential. This invention is based on a transducer for converting electrical energy to mechanical energy which utilizes an electrostrictive fluid, such as an electro-viscous fluid.

Briefly, the transducer of this invention comprises two members having opposing, spaced, electrically conductive surfaces between which an electrostrictive fluid, e.g., an electro-viscous fluid, is confined. The electrostrictive fluid is in contact with the electrically conductive surfaces of the two members, at least one of which is a thin flexible diaphragm. The flexible diaphragm in contact with the electrostrictive fluid provides a pressure communication between the transducer and some outside system. When an electric potential is applied between the electrically conductive surfaces, the electrostrictive fluid exhibits a change in volume to cause the diaphragm in contact therewith to move. As the applied electric potential is varied with respect to time, the movement of the diaphragm will also vary. It will therefore be apparent that a vibratory motion will be applied to the diaphragm, and hence to an outside system mechanically connected to the diaphragm, by the application of a transient electric potential between the electrically conductive surfaces.

It is therefore an object of this invention to provide a transducer of the character indicated.

Another object of this invention is to provide a transducer utilizing an electrostrictive fluid.

Still another object of this invention is to provide a transducer utilizing an electro-viscous fluid as an electrostrictive fluid.

A further object of this invention is to provide a transducer and method for converting electrical energy into mechanical energy by utilizing an electro-viscous fluid in contact with a flexible diaphragm which provides a pressure communication between the electro-viscous fluid and an outside system.

These and further objects of this invention will become apparent or be described as the description thereof herein proceeds and reference is made to the accompanying drawings in which.

Figure 1:
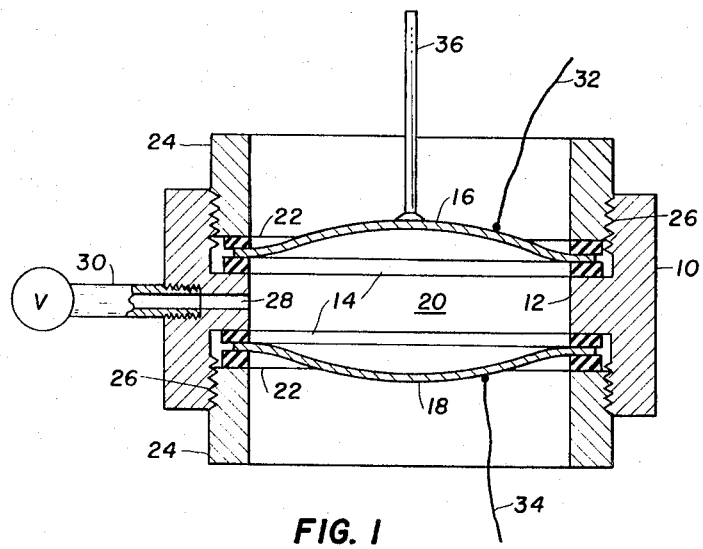
FIGURE 1 is a side view, in section, of a transducer of this invention.

Referring to FIGURE 1, the reference numeral 10 designates a metallic tubular member of cylindrical cross-section which is formed with inwardly-extending projection 12 intermediate the ends thereof. Received on opposite sides of projection 12 are inner ring-shaped gaskets 14, which are fabricated of a resilient, electrically non-conductive material such as rubber. Flexible metal diaphragms 16 and 18 are mounted on inner ring-shaped gaskets 14 to form space 20 therebetween. Diaphragms 16 and 18 are rigidly held in place by outer ring-shaped gaskets 22, which are pressed against diaphragms 16 and 18 by metallic rings 24. Gaskets 22 are also fabricated of a resilient, electrically insulating material such as rubber. Rings 24 are secured to tubular member 10 by threads 26.

Extending through the wall of tubular member 10 at a point where it will pass through projection 12 to enter space 20 is opening 28. Opening 28 is preferably threaded to receive valve-controlled conduit 30. An electrostrictive fluid, such as an electro-viscous fluid, is charged in space 20 in sufficient volume to completely fill space 20, preferably to put diaphragms 16 and 18 under a slight tension.

Lead wires 32 and 34 are electrically connected, as by being soldered, to diaphragms 16 and 18, respectively. Lead wires 32 and 34 are used to connect diaphragms 16 and 18 to a source for applying electrical potential to diaphragms 16 and 18, thereby subjecting the electrostrictive fluid in space 20 to the influence of an electrical potential. Rod 36 is cemented to the outer surface of diaphragm 16 to provide a rigid mechanical connection between an outside system and diaphragm 16.

The apparatus depicted in FIGURE 1 may be utilized in numerous systems using prior art transducers to convert electrical energy to mechanical energy. When lead wires 32 and 34 are electrically connected to a source of pulsating electrical energy, the electrostrictive fluid in space 20 will constantly change dimensions in response to the varying electric field. This phenomenon exhibited by the electrostrictive fluid will impart vibratory motion to diaphragm 16, which in turn will apply a vibratory motion to the external system mechanically connected to rod 36 in response to the varying electrical field.

As for example, when the transducer is utilized in an audio system, lead wires 32 and 34 are connected to the output leads of an audio amplifier and the extended free end of rod 36 is mechanically connected to the apex of a conical speaker.

It will be obvious that various modifications can be made of the apparatus of FIGURE 1 without departing from the intended scope of this invention. For example, electroviscous fluids are only given as an example of suitable electrostrictive fluids. Ring-shaped gaskets 14 and 22 can be omitted if tubular member 10 and rings 24 are fabricated of an electrically non-conductive material, such as Bakelite, Teflon, etc. While both diaphragms 16 and 18 are described as being flexible, it will be apparent that only diaphragm 16 need be flexible. Hence, if desired, diaphragm 16 and 18 may be fabricated of a flexible electrically non-conductive material, such as an organoplastic material or rubber, provided the opposing surfaces thereof have electrically conducting coatings. Rod 36 may extend out of the side of the transducer through registered openings in either tubular member 10 and a gasket 22, or a ring member 24 and tubular member 10.

Figure 2:
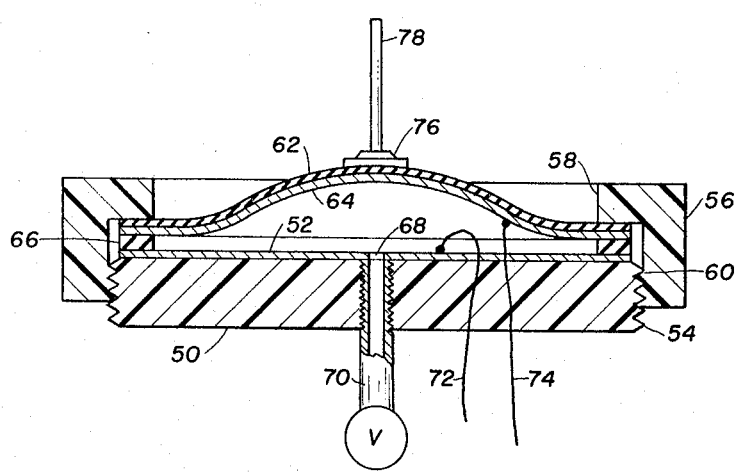
FIGURE 2 is a side view, in section, of an alternative embodiment of a transducer of this invention.

In the alternative embodiment of the transducer of this invention illustrated in FIGURE 2, base 50, which is fabricated of an electrical non-conductive material, has on the upper surface thereof a thin electrically conductive layer 52. Base 50 is provided with external threads 54 around the periphery thereof. Electrically non-conductive ring member 56 formed with inwardly-extending lip 58 is secured to base 50 by internal threads 60. Held in place between lip 58 and base 50 is flexible diaphragm 62, which is fabricated of a resilient, electrically non-conductive material, such as rubber. Diaphragm 62 is provided with a thin internal coating 64 of an electrically conductive material. Layer 52 and coating 64 are maintained separated from each other by electrically insulating ring-shaped gasket 66.

Extending through base 50 and coating 52 is opening 68 which is used to introduce an electrostrictive fluid in the space between base 50 and diaphragm 62. A sufficient quantity of the electrostrictive fluid is introduced to completely fill the space between base 50 and diaphragm 62. Opening 68 preferably has internal threads to secure valve-controlled conduit 70 thereto.

Lead wire 72 extends through base 50 and is connected to layer 52 as by being soldered. Similarly, lead wire 74 is soldered to coating 64. Lead wires 72 and 74 are used to connect the apparatus to a source of pulsating electric potential. Cemented to the outer surface of diaphragm 62 is support member 76 for rod 78. Rod 78 is used to provide a rigid mechanical connection between diaphragm 62 and an outside system.

As an example of the electrostrictive properties of electro-viscous fluids, a fluid of the following composition

| | Wt. percent |
|---|---|
| Refined lubricating oil | 30.5 |
| Silica | 50.0 |
| Glycerol monooleate | 5.5 |
| Ethylene glycol | 4.0 |
| 1-hydroxy ethyl 2-heptadecenyl imidazoline | 10.0 | is placed in an apparatus similar to that depicted in FIGURE 2 and lead wires 72 and 74 are connected through a switch to a 5000-volt D.C. potential source. When the circuit is completed by closing the switch, rod 78 moves upwardly. When the switch is opened, rod 78 returns to its former position. When the switch is continuously closed and opened, it is noted that rod 78 moves upwardly and then downwardly in response to the circuit being completed and broken.

The electro-viscous fluid of the foregoing formulation is only given as an example of one suitable fluid which may be used in the apparatus of this invention. In the absence of an applied electric field, the electro-viscous fluids may be either readily flowing compositions of relatively low viscosity or compositions of relatively high viscosity, i.e., of a grease-like consistency. In general, the electro-viscous fluids are comprised of about 5 to 50% by volume of particulate non-conducting materials dispersed in a non-polar oleaginous vehicle, which is weakly adsorbed by the particulate material and has a dielectric constant less than about 5. The non-conducting particles are of a non-piezoelectric material, have an average size in the range of about 0.1 to 5.0 microns diameter, and include, as for example, finely-divided silica, calcium titanate, barium titanate, aluminum octoate, aluminum stearate, crystalline D-sorbitol, and zinc stearate. The oleaginous vehicle is preferably a refined mineral oil fraction having a viscosity within the range of about 50 to 300 SUS at 100° F. and an initial boiling point greater than about 500° F. However, a wide variety of non-polar oleaginous vehicles which are weakly absorbed by the non-conducting particles can be employed, such as white oils, transformer oils, synthetic oils resulting from the polymerization of unsaturated hydrocarbons, fluorinated hydrocarbons in the lubricating oil viscosity range, tributyl phosphate, etc. Where relatively large volumes of the non-conducting particles are incorporated in the electro-viscous fluid, it is usually necessary to add a material to fluidize the mixture and keep the viscosity of the product electro-viscous fluid at a reasonable level. For this purpose, up to about 25% by volume of a neutral surfactant, such as polyoxyalkylene ethers, glycerol monooleate, sorbitan sesquioleate, etc., can be incorporated to maintain a mixture of the particles and vehicle as a fluid. If the electro-viscous fluid is intended for activation by a constant potential, it is necessary to incorporate in the fluid about 0.1 to 25% by volume of a basic, nitrogen organic compound such as substituted or unsubstituted amines and imadizolines. Specific examples of such compounds include butyl amine, hexyl amine, ethanol amine, 2-amino-ethyl amine, diethyl amine, pyridine, diethanol amine, triethyl amine, triethanol amine, and tripropanol amine. A variety of polar materials, including water and lower hydroxy-substituted hydrocarbons may be used in an amount of about 1 to 15% by volume to activate the electro-viscous fluid. Reference is made to U.S. Patent 3,047,507, which is hereby incorporated by reference, for a further description of the electro-viscous fluids.

In general, the transducers of this invention will operate satisfactorily when the electro-viscous fluids are subjected to transient electric potentials having a maximum magnitude within the range of about 1000 to 10,000 volts, although other voltages may be used. The thickness of the electro-viscous fluid film will generally be about 0.001 to 0.100 inch. The term "transient electric potential" is intended to include an electric field having a changing voltage, i.e., an alternating current or a pulsating direct current.

The embodiments of this invention in which an exclusive property or privilege is claimed are defined as follows:

1. A transducer for converting electrical energy to mechanical energy comprising two members having opposing, spaced, electrically conductive, surfaces electrically insulated from each other, at least one of said members being a flexible diaphragm, an electrostrictive fluid confined in the entire space between said surfaces, said fluid comprising particles having non-piezoelectric properties, and electrical conductor means connected to each of the electrically conductive surfaces, whereby application of a varying electric potential results in change in volume of the electrostrictive fluid to produce mechanical energy.

2. A transducer in accordance with claim 1 including a rigid mechanical coupling connected to a flexible diaphragm.

3. A transducer in accordance with claim 2 in which both of said members are flexible diaphragms.

4. A transducer in accordance with claim 3 including a tubular body having an inwardly-extending projection intermediate the ends thereof and means for holding said members on opposite sides of said projection.

5. A transducer in accordance with claim 4 in which said body member has a cylindrical interior surface.

6. A transducer in accordance with claim 5 in which each of said members is held at the periphery thereof by a ring in the interior of said tubular body.

7. A transducer in accordance with claim 6 in which said tubular body is internally threaded and said rings are externally threaded and adapted to be threadably engaged with said tubular body.

8. A transducer in accordance with claim 7 in which said flexible diaphragms are fabricated of metal.

9. An apparatus in accordance with claim 8 including electrically non-conductive washers between both of said rings and said diaphragms and between said diaphragms and said projection.

10. A transducer in accordance with claim 9 in which said tubular body and rings are fabricated of metal.

11. A transducer in accordance with claim 2 in which only one of said members is a flexible diaphragm, said flexible diaphragm being held to said other member in electrically insulating relationship therewith at the peripheries of said members.

12. A transducer in accordance with claim 1 in which said electrostrictive fluid is an electro-viscous fluid.

References Cited by the Examiner
UNITED STATES PATENTS

| | | | |
|---|---|---|---|
| 1,684,530 | 9/1928 | Bast | 92—103 |
| 2,661,596 | 12/1953 | Winslow | 60—52 |
| 2,661,825 | 12/1953 | Winslow | 192—21.5 |
| 3,047,507 | 7/1962 | Winslow | 252—75 |
| 3,070,775 | 12/1962 | Andrews | 340—10 |

MILTON O. HIRSHFIELD, *Primary Examiner.*

J. D. MILLER, *Assistant Examiner.*